United States Patent Office 3,239,543
Patented Mar. 8, 1966

3,239,543
NITRODIPHENYLAMINE DYESTUFFS
Elmore L. Bement, Buffalo, N.Y., assignor to Allied Chemical Corporation, New York, N.Y., a corporation of New York
No Drawing. Filed May 4, 1962, Ser. No. 192,358
6 Claims. (Cl. 260—397.7)

This invention relates to novel nitrodiphenylamine compounds useful as dyestuffs. It relates more particularly to novel derivatives of 4-arylamino-3-nitrobenzenesulfonamides, processes for their manufacture and their use in the coloring of aromatic polyester material of the polyalkylene terephthalate type.

Aromatic polyester material of said type consists of highly polymeric linear esters of terephthalic acid and glycols of the series $HO(CH_2)_nOH$, $n$ being an integer from 2 to 10. Such esters are obtainable, for example, by the reaction under polymer forming conditions of terephthalic acid (or an ester forming derivative thereof) with ethylene glycol, trimethylene glycol, tetramethylene glycol, hexamethylene glycol or decamethylene glycol. They are available commercially in the form of foils, fabrics and particularly fibers (e.g., polyethylene terephthalate fibers known as "Dacron," "Terylene" and "Kodel" and sold as filaments, yarns and in various textile forms) and are of increasing importance in view of their ready availability and outstanding utility as textile materials. A method of producing such polyethylene terephthalate fiber is disclosed in U.S. Patent 2,465,319 to Winfield and Dickens.

Aromatic polyester material of the polyalkylene terephthalate type, being characterized by excellent strength, resistance to creasing, to shrinking and to stretching, and excellent washability, is being utilized to an increasing extent in the textile and allied industries. This in turn has led to a correspondingly increasing demand for dyestuffs suitable for coloring such material. The polyester material, however, suffers from the disadvantages of having poor affinity for the known classes of dyestuffs and of not readily absorbing liquids. Accordingly, the demand for suitable dyestuffs has been satisfied by the creation of new dyes and special dyeing techniques which render the known dyes suitable for these new fibers. For the most part, these special techniques have produced dyeings which are either fugitive to light and/or possess poor fastness to sublimation and hence in these and other respects the known expedients leave much to be desired.

An object of the present invention is to provide coloring agents for aromatic polyester material of the polyalkylene terephthalate type which color said material in bright shades possessing good fastness properties.

Another object of the present invention is to provide a class of dyestuffs for polyethylene terephthalate fiber which dye said fiber bright shades possessing excellent fastness properties, especially to sublimation.

Another object of the present invention is to provide a class of dyestuffs for dyeing aromatic polyester material of the polyethylene terephthalate type, which dyestuffs can be readily applied by the known dyeing procedures and produce dyed material having outstanding fastness to sublimation. (As employed herein the term "dyeing" includes various dyeing and printing procedures, and the term "dyed" includes colored material produced by dyeing and printing procedures.)

A further object of the present invention is to provide a novel class of organic compounds which dye polyalkylene terephthalate material in bright yellow shades of good fastness to light and to sublimation.

Another object is to provide a novel class of 4-anilino-3-nitrobenzenesulfonamides which are useful for coloring polyalkylene terephthalates in yellow shades of excellent fastness to light and to sublimation.

An additional object is to provide a process for the preparation of 4-arylamino-3-nitrobenzenesulfonamides bearing as a substituent on the sulfonamide nitrogen at least one lower cyanoalkyl group.

Other objects of the invention will in part be obvious and will in part appear hereinafter.

It is known to dye cellulose acetate with certain water-insoluble disperse dyes which are 4-arylamino-3-nitrobenzenesulfonamides. Thus, U.S. Patents 2,466,010 and 2,466,011 disclose water-insoluble disperse dyestuffs of this type wherein one or both of the hydrogen atoms of the $—SO_2NH_2$ radical are substituted by one or two alkyl groups, hydroxy-alkyl groups, alkoxy-alkyl groups, or hydroxy-alkoxy-alkyl groups. But, when it is attempted to employ compounds of this type for the dyeing of aromatic polyester material of the polyalkylene terephthalate type, the results are unsatisfactory owing to their lack of adequate fastness properties.

I have discovered a novel class of 4-arylamino-3-nitrobenzenesulfonamides in which at least one of the hydrogen atoms of the $—SO_2NH_2$ radical is substituted by a lower cyano-alkyl radical (that is, a cyanomethyl, cyanoethyl, cyanopropyl, cyanobutyl, cyano-amyl or cyanohexyl radical), and the aryl radical is a mononuclear aryl radical (such as, a phenyl radical or a substituted phenyl radical having as a nuclear substituent a lower alkyl group, a lower alkoxy group or a halogen atom).

I have further discovered that said novel class of sulfonamides have exceptional utility as coloring agents for aromatic polyester material of the polyalkylene terephthalate type and especially as dyes for fibers of said material. Thus, I have discovered that they dye aromatic polyester material of the polyethylene terephthalate type, and especially polyethylene terephthalate fiber, bright greenish yellow to orange shades which are extremely fast to light and to sublimation. These remarkable qualities are the more surprising in view of the extremely limited number of dyestuffs which have been found to possess the required combination of desirable shade, fastness to light and fastness to sublimation.

The 4-arylamino-3-nitrobenzene-sulfonamides of the present invention have the formula I 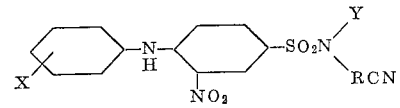

wherein
X is selected from the group consisting of hydrogen, halogen, lower alkyl and lower alkoxy,
Y is selected from the group consisting of hydrogen, lower alkyl, lower hydroxyalkyl, lower alkoxy lower alkyl, and lower cyano-alkyl, and
RCN is lower cyano-alkyl.

Thus, they include compounds in which the aryl radical of the 4-mononuclear arylamino radical is the phenyl radical or a substituted phenyl radical (such as, chlorophenyl, bromophenyl, tolyl, ethylphenyl, propylphenyl, cumyl, cymyl, methoxyphenyl, ethoxyphenyl, propoxyphenyl, and the like) and in which (a) only one of the hydrogen atoms of the $—SO_2NH_2$ radical is substituted by a lower cyano-alkyl radical (such as, one of those listed above) or (b) both of the hydrogen atoms of the $—SO_2NH_2$ radical are substituted by the same or by two different lower cyano-alkyl radicals or (c) one of said hydrogen atoms is substituted by a lower cyano-alkyl radical and the other hydrogen atom is substituted by a lower alkyl radical (such as methyl, ethyl, propyl, butyl, amyl or hexyl) or a lower hydroxyalkyl radical (such as, beta-hydroxyethyl, hydroxypropyl, hydroxybutyl, hydroxyamyl or hydroxyhexyl), or a lower alkoxy lower alkyl group (such as, beta-methoxyethyl-gamma-methoxypropyl).

Preferred compounds are those in which X in the above Formula I is hydrogen and Y is RCN, e.g., 4-anilino-N,N-bis(2-cyanoethyl) - 3-nitrobenzenesulfonamide, 4-anilino-N-(4-cyanobutyl)-N-(2-cyanoethyl) - 3 - nitrobenzenesulfonamide, etc.

Examples of the compounds of the present invention are:

4-anilino-N-(2-cyanoethyl)-3-nitrobenzenesulfonamide
4-anilino-N,N-bis(2-cyanoethyl)-3-nitrobenzenesulfonamide
4-anilino-N-(2-cyanoethyl)-N-(2-hydroxyethyl)-3-nitrobenzenesulfonamide
4-anilino-N-(2-cyanoethyl)-N-ethyl-3-nitrobenzenesulfonamide
4-anilino-N-(6-cyanohexyl)-N-(3-hydroxypropyl)-3-nitrobenzenesulfonamide
N-(2-cyanoethyl)-4-(2'-methoxyphenylamino)-3-nitrobenzenesulfonamide
N-(2-cyanoethyl)-4-(3'-methoxyphenylamino)-3-nitrobenzenesulfonamide
4-(4'-chlorophenylamino)-N-(2-cyanoethyl)-3-nitrobenzenesulfonamide
N-(2-cyanoethyl)-4-(4'-ethoxyphenylamino)-N-(2-hydroxyethyl)-3-nitrobenzenesulfonamide
N-(2-cyanoethyl)-4-(4'-ethoxyphenylamino)-N-ethyl-3-nitrobenzenesulfonamide
N-(2-cyanoethyl)-4-(4'-ethoxyphenylamino)-3-nitrobenzenesulfonamide
N-(5-cyanoamyl)-4-(p-toluino)-3-nitrobenzenesulfonamide
4-anilino-N-(2-cyanoethyl)-N-(2-methoxyethyl)-3-nitrobenzenesulfonamide The compounds of the present invention can be synthesized in a number of ways. I prefer to prepare them by heating, for at least one hour, a 4-halo-3-nitrobenzenesulfonamide substituted in the sulfonamide radical by at least one cyano-alkyl group, with a slight molar excess of a suitable primary arylamine at a temperature sufficient to melt the resultant mixture; thereafter dissolving the melt in an organic solvent (such as, ethanol, methanol, a mixture of ethanol and acetone, and the like); cooling the resultant solution to cause precipitation of the desired diphenylamine product, and recovering the product in any suitable manner, as by filtration, washing of the filter cake and drying.

Various N-cyano-alkyl-4-halo - 3 - nitrobenzene-sulfonamides and primary mononuclear arylamines can be employed in this synthesis.

Thus, suitable N - cyano - alkyl - 4-halo-3-nitrobenzenesulfonamides have the formula

II

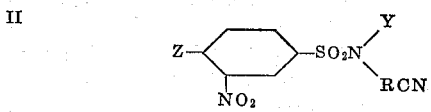

wherein

Z is halogen (e.g., chlorine or bromine), and Y and RCN have the same meaning as above.

Representative intermediate compounds of this class are:

4-chloro-N-(2-cyanoethyl)-3-nitrobenzenesulfonamide
4-chloro-N,N-bis(2-cyanoethyl)-3-nitrobenzenesulfonamide
4-chloro-N-(2-cyanoethyl)-N-(2-hydroxyethyl)-3-nitrobenzenesulfonamide
4-chloro-N-(2-cyanoethyl)-N-ethyl-3-nitrobenzenesulfonamide The 4-bromo compounds corresponding to the above 4-chloro compounds 4-chloro-N-cyanomethyl-N-methyl-3-nitrobenzenesulfonamide
4-bromo-N-(3-cyanopropyl)-N-hydroxymethyl-3-nitrobenzenesulfonamide
N-amyl-4-bromo-N-(4-cyanobutyl)-3-nitrobenzenesulfonamide
4-chloro-N-(2-cyanoethyl)-N-(6-hydroxyhexyl)-3-nitrobenzenesulfonamide
4-chloro-N-(4-cyanobutyl)-3-nitrobenzenesulfonamide
4-bromo-N-(3-cyanopropyl)-3-nitrobenzenesulfonamide
4-bromo-N-cyanomethyl-N-(3-cyanopropyl)-3-nitrobenzenesulfonamide
4-bromo-N,N-bis(3-cyanopropyl)-3-nitrobenzenesulfonamide
4-bromo-N-(2-cyanoethyl)-N-(2-methoxyethyl)-3-nitrobenzenesulfonamide
4-chloro-N-(3-cyanopropyl)-N-(2-ethoxyethyl)-3-nitrobenzenesulfonamide Suitable primary mononuclear arylamines for combination with any of the above N-cyano-alkyl-4-halo-3-nitrobenzenesulfonamides are:

aniline
o-toluidine
m-toluidine
p-toluidine
o-chloro-aniline
m-chloro-aniline
p-chloro-aniline
o-bromo-aniline
m-bromo-aniline
p-bromo-aniline
o-anisidine (o-methoxy-aniline)
m-anisidine
p-anisidine
o-phenetidine (o-ethoxy-aniline)
m-phenetidine
p-phenetidine
o-propoxyaniline
m-propoxyaniline
p-propoxyaniline
o-butoxyaniline
m-butoxyaniline
p-butoxyaniline
o-amoxyaniline
m-amoxyaniline
p-amoxyaniline
o-hexoxyaniline
m-hexoxyaniline, and
p-hexoxyaniline The coloring, and particularly the dyeing, of polyethylene terephthalate fiber and other aromatic polyester material of the polyalkylene terephthalate type can be carried out by any of the methods heretofore known for the coloring of such material. It is a feature of the present invention that the compounds of the present invention do not require any special dyeing technique for their successful application to said material. The 4-arylamino-3-nitrobenzenesulfonamides of the present invention are water-insoluble or poorly soluble in water at best, and hence they are applied from aqueous dispersions in the manner of the well known "disperse dyes." Thus they may be applied by the various methods heretofore described as useful for the application to said aromatic polyester material of the water-insoluble dyes normally used for the dyeing and printing of said material.

For instance, the dyeing of textile fibrous material formed of terephthalate polyesters of the type referred to above is advantageously carried out by working the fibrous material in a dyebath containing a dispersion of one or a mixture of the sulfonamides of my invention and preferably also containing a dyeing assistant (such as phenol, orthophenylphenol, chlorobenzene, benzoic acid, salicyclic acid, or mixtures thereof). The dyeing operation is carried out at 80° to 115° C. and preferably at the boiling temperature or slightly above. By using a closed apparatus, the dyeing operation can be performed at superatmospheric pressures and at temperatures above the boiling point of the dyebath at atmospheric pressure. More specific information on methods of dyeing said fibrous material is disclosed in U.S. Patent 2,833,613;
British Patents 609,943 and 609,944;
Australian Patent 13,884 of 1955;
"Principles of Dyeing 'Dacron' Polyester Fiber" in American Dyestuff Reporter 41 (1952) 860
"'Thermosol' Method of Dyeing" in American Dyestuff Reporter 42 (1953) 1, and
"Dyeing of 'Dacron' Polyester Fiber—Evaluation of Dyeing Assistants," in DuPont Technical Bulletin, volume 8, No. 2 (June 1952), page 69.

The novel compounds of my invention can be converted to readily dispersible powders useful as disperse dyes by admixing them with any of the usual dispersing agent or mixture of dispersing agents (such as sulfonated lignin containing sodium sulfonate groups or similar sulfite cellulose waste liquor products, formaldehyde condensation products of naphthalene β-sulfonic acid, formaldehyde condensation products of alkyl naphthalene sulfonates, polymerized naphthalene sodium sulfonate, etc.), grinding the mixture in the presence of water, drying the dispersed mixture and grinding the dried product. Other dispersing procedures can be used, as will be obvious to those skilled in this art. It is usually advantageous to use a mixture of dispersing agents, to obtain readily a desired combination of properties (wetting, dispersing, etc.).

In carrying out the dyeing, the powder is added to the dyebath, which may or may not contain a dyeing assistant, and the material to be dyed is then entered into the dyebath and worked in the usual manner.

The amount of coloring agent of the present invention employed will depend upon the depth of coloring desired to be obtained. For example, in the dyeing of polyethylene terephthalate fiber, amounts of the 4-arylamino-3-nitrobenzenesulfonamide ranging from about 0.1% or less to about 10% or more of the weight of the fiber may be employed for the dyeing of pastel to heavy shades.

The invention will be illustrated by the following specific examples, but it is to be understood that it is not limited to the details thereof and that changes can be made without departing from the scope of the invention. The temperatures are in degrees centigrade and the parts and percentages are by weight.

EXAMPLE 1

Part A.—A mixture of 10 parts of 4-chloro-N,N-bis(2-cyanoethyl)-3-nitrobenzenesulfonamide and 10.2 parts of aniline was heated to, and maintained for three hours at 130° to 140°. The mass was cooled to about 100°, and then 160 parts of denatured ethyl alcohol (Formula 2B) were added. The mixture was heated until a homogeneous solution resulted and then it was set aside to cool slowly overnight (about 16 hours). The resultant slurry of yellow needles was filtered and washed with cold denatured ethyl alcohol. The washed product was dried in a circulating hot air drier.

The resulting product, 4-anilino-N,N-bis(2-cyanoethyl)-3-nitrobenzenesulfonamide having the formula:

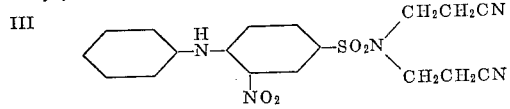

had a melting point of 166° to 168°. The yield was 4.27 parts.

Part B.—The total product of Part A of this example was mixed with 2.28 parts of a commercial sodium lignin sulfonate containing about 23% of sodium sulfonate groups (Polyfon XTH), 0.98 part of a commercial formaldehyde condensation product of β-naphthalene sulfonate (Tamol N) and 100 parts of water in a high speed mixer (Waring Blendor) until thoroughly dispersed. The dispersion was dried and ground.

Part C.—The disperse dyestuff obtained in Part B of this example was employed to dye polyethylene terephthalate fiber (Dacron polyester fiber) in the following manner. To a bath prepared by heating a suspension of 10 parts of o-phenylphenol in 500 parts of water to the boil, 0.1 part of the dispersible dye powder prepared as in Part B was added. Ten parts of polyethylene terephthalate ("Dacron") cloth were entered into this dyebath and the cloth was worked therein for one hour at the boil. The cloth was removed, rinsed well in cold water, and then scoured for 15 minutes at the boil in 400 parts of a 0.2% aqueous solution of a commercial higher alkylbenzene sodium sulfonate detergent ("Nacconol NR"). The dyed material was rinsed well with cold water and then dried. The resulting dyeings were light, greenish-yellow in shade and had excellent fastness to light and to sublimation.

EXAMPLE 2

A mixture of 10 parts of 4-chloro-N,N-bis(2-cyanoethyl)-3-nitrobenzenesulfonamide and 21.2 parts of p-phenetidine was heated in a steam bath for about one hour. A solvent mixture of about 80 parts of denatured ethyl alcohol and 40 parts of acetone was added, the mass was heated until a homogeneous solution resulted which was then permitted to cool gradually. The resulting slurry of yellow needles was filtered, washed with cold alcohol and dried in a circulating hot air drier. The dried product weighed 8.25 parts and melted at 180° to 183°. It was identified as N,N-bis(2-cyanoethyl)-4-(4'-ethoxyphenylamino)-3-nitrobenzenesulfonamide having the formula

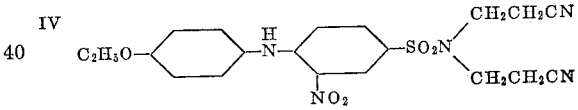

On being dispersed with 5.77 parts of sodium lignin sulfonate (Polyfon XTH) and 1.48 parts of formaldehyde-naphthalene sulfonate condensation product (Tamol N), a dyestuff mixture was obtained which dyed aromatic polyester material (Dacron polyester fiber) in yellow-orange shades characterized by outstanding fastness to light and to sublimation.

EXAMPLES 3 THROUGH 11

In a manner similar to that described above, aniline, para-chloraniline, ortho-anisidine, meta-anisidine or para-phenetidine was condensed with one of the following 4-chloro-3-nitrobenzenesulfonamides:

4-chloro-N-(2-cyanoethyl)-N-(2-hydroxyethyl)-3-nitrobenzenesulfonamide
4-chloro-N-(2-cyanoethyl)-3-nitrobenzenesulfonamide
4-chloro-N-(2-cyanoethyl)-N-ethyl-3-nitrobenzenesulfonamide to produce 4-anilino-3-nitrobenzene-sulfonamide dyestuffs of the present invention corresponding to the following formula, as set out in Table I below:

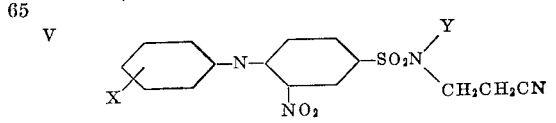

When dispersed in the above described fashion and dyed on Dacron polyester fiber, the resultant dyeings had the shades listed in Table I. In each instance the dyeings were characterized by excellent fastness to light and to sublimation.

Table I

| Example | X | Y | Shade on Dacron |
|---|---|---|---|
| 3 | H | —CH$_2$CH$_2$OH | Greenish-yellow. |
| 4 | 4-OC$_2$H$_5$ | —CH$_2$CH$_2$OH | Reddish-yellow. |
| 5 | H | H | Yellow. |
| 6 | 4-OC$_2$H$_5$ | H | Orange-yellow. |
| 7 | H | —C$_2$H$_5$ | Reddish-yellow. |
| 8 | 4-OC$_2$H$_5$ | —C$_2$H$_5$ | Yellow-orange. |
| 9 | 3-OCH$_3$ | H | Reddish-yellow. |
| 10 | 2-OCH$_3$ | H | Orange-yellow. |
| 11 | 4-Cl | H | Greenish-yellow. |

It will be obvious to those skilled in this art that the specific details of these illustrative examples can be varied and that such variations are within the scope of this invention.

For example, other primary mononuclear arylamines can be used in place of those employed in the examples, such as those set out above.

Similarly, other N-cyano-alkyl-4-halo-3-nitrobenzenesulfonamides can be used in place of those employed in the examples, such as those set out above.

The condensation reaction also can be carried out with the inclusion of an acid binding agent in the reaction mixture (such as sodium carbonate, potassium acetate, dimethyl aniline, pyridine, and the like). If desired, the reaction can be effected in the presence of a nonreactive mutual solvent (such as an alcohol, e.g., ethanol or butanol) but such is not generally preferred due to the comparatively low reflux temperature such a reaction mixture provides, with the consequent extension of the reaction time.

The compounds of the present invention are useful primarily as yellow dyes of the disperse class for aromatic polyesters of the polyalkylene terephthalate type because of the unusual fastness of the resultant dyeings to the combined agencies of light and sublimation. They also can be used, however, to dye cellulose acetate and cellulose triacetate ("Arnel") in distinctive yellow shades which are also characterized by their excellent fastness to light.

I claim:

1. A 4-arylamino-3-nitrobenzenesulfonamide having the formula

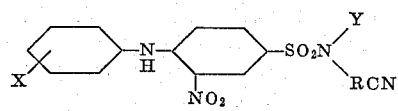

wherein

X is selected from the group consisting of hydrogen, halogen, lower alkyl and lower alkoxy, Y is selected from the group consisting of hydrogen, lower alkyl, lower hydroxyalkyl, lower alkoxy lower alkyl, and lower cyano-alkyl, and RCN is lower cyano-alkyl.

2. A 4-mononuclear arylamino-3-nitrobenzenesulfonamide as defined in claim 1 in which at least one of the hydrogen atoms of the —SO$_2$NH$_2$ radical is substituted by a lower cyano-alkyl radical.

3. 4-Anilino-N,N-bis(lower cyano - alkyl) - 3-nitrobenzenesulfonamide.

4. 4-Anilino-N-lower cyano - alkyl - 3-nitrobenzenesulfonamide.

5. 4 - Anilino - N,N-bis(2-cyanoethyl)-3-nitrobenzenesulfonamide.

6. 4 - Anilino - N-(2-cyanoethyl)-3-nitrobenzenesulfonamide.

References Cited by the Examiner

UNITED STATES PATENTS

| | | | |
|---|---|---|---|
| 2,164,793 | 7/1939 | Winter et al. | 260—240.9 |
| 2,280,253 | 4/1942 | Muller et al. | 260—240.9 |
| 2,466,010 | 4/1949 | Dickey et al. | 260—307.7 |
| 2,466,011 | 4/1949 | Dickey et al. | 260—397.7 |
| 2,649,440 | 8/1953 | Dickey et al. | 260—207.5 |
| 2,830,043 | 5/1958 | Merian | 260—207.5 |
| 2,873,270 | 2/1959 | Merian | 260—207.5 |
| 2,875,125 | 2/1959 | Gaertner | 260—397.7 |
| 2,882,119 | 4/1959 | Laucius et al. | 8—55 |
| 2,884,300 | 4/1959 | Braun et al. | 8—55 |
| 2,885,435 | 5/1959 | Pursglove | 260—397.7 X |
| 2,927,126 | 3/1960 | Pursglove | 260—397.7 X |
| 2,938,905 | 5/1960 | Slinger | 260—556.5 X |

FOREIGN PATENTS

| | | |
|---|---|---|
| 756,079 | 8/1956 | Great Britain. |
| 353,330 | 5/1961 | Switzerland. |

OTHER REFERENCES

American Cyanamid text, "The Chemistry of Acrylonitrile," 2d ed., pages 24 and 199–202, American Cyanamid Co., N.Y. (1959).

Misra et al.: J. Prakt. Chem., vol. 3 (4th series), pp. 4–12 (1956).

Misra et al.: J. Prakt. Chem., vol. 4 (4th series), p. 270 (1957).

WALTER A. MODANCE, Primary Examiner.

ABRAHAM H. WINKLESTEIN,
JOHN D. RANDOLPH, Examiners.